(12) United States Patent
Alos

(10) Patent No.: US 6,542,731 B1
(45) Date of Patent: Apr. 1, 2003

(54) MOBILE TELEPHONE HAVING ANTITHEFT OPERATION AND METHODS THEREOF

(75) Inventor: Rafael Alos, Osny (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/366,706

(22) Filed: Aug. 2, 1999

(30) Foreign Application Priority Data

Jul. 31, 1998 (FR) .............................................. 98 09856

(51) Int. Cl.⁷ ................................................ H04M 1/66
(52) U.S. Cl. ...................................... 455/411; 455/405
(58) Field of Search ............................... 455/409, 405, 455/406, 407, 408, 410, 411

(56) References Cited

U.S. PATENT DOCUMENTS 5,301,223 A * 4/1994 Amadon et al. ............ 455/409
5,870,459 A * 2/1999 Phillips et al. .......... 455/409 X
5,870,671 A * 2/1999 Martinez .................... 455/409

FOREIGN PATENT DOCUMENTS

EP    0 796 023    9/1997
GB    2 309 860    8/1997

* cited by examiner

Primary Examiner—William Trost
Assistant Examiner—Philip J. Sobutka
(74) Attorney, Agent, or Firm—Miles & Stockbridge P.C.

(57) ABSTRACT

An antitheft method for a mobile telephone for a cellular network comprises: assigning a provisional identity number to the mobile telephone before a definitive identity number is assigned to the mobile telephone; counting the cumulative duration of operation as long as the definitive identity number has not been assigned; and disabling the operation of the mobile telephone when the cumulative duration of operation reaches a time limit.

5 Claims, 1 Drawing Sheet

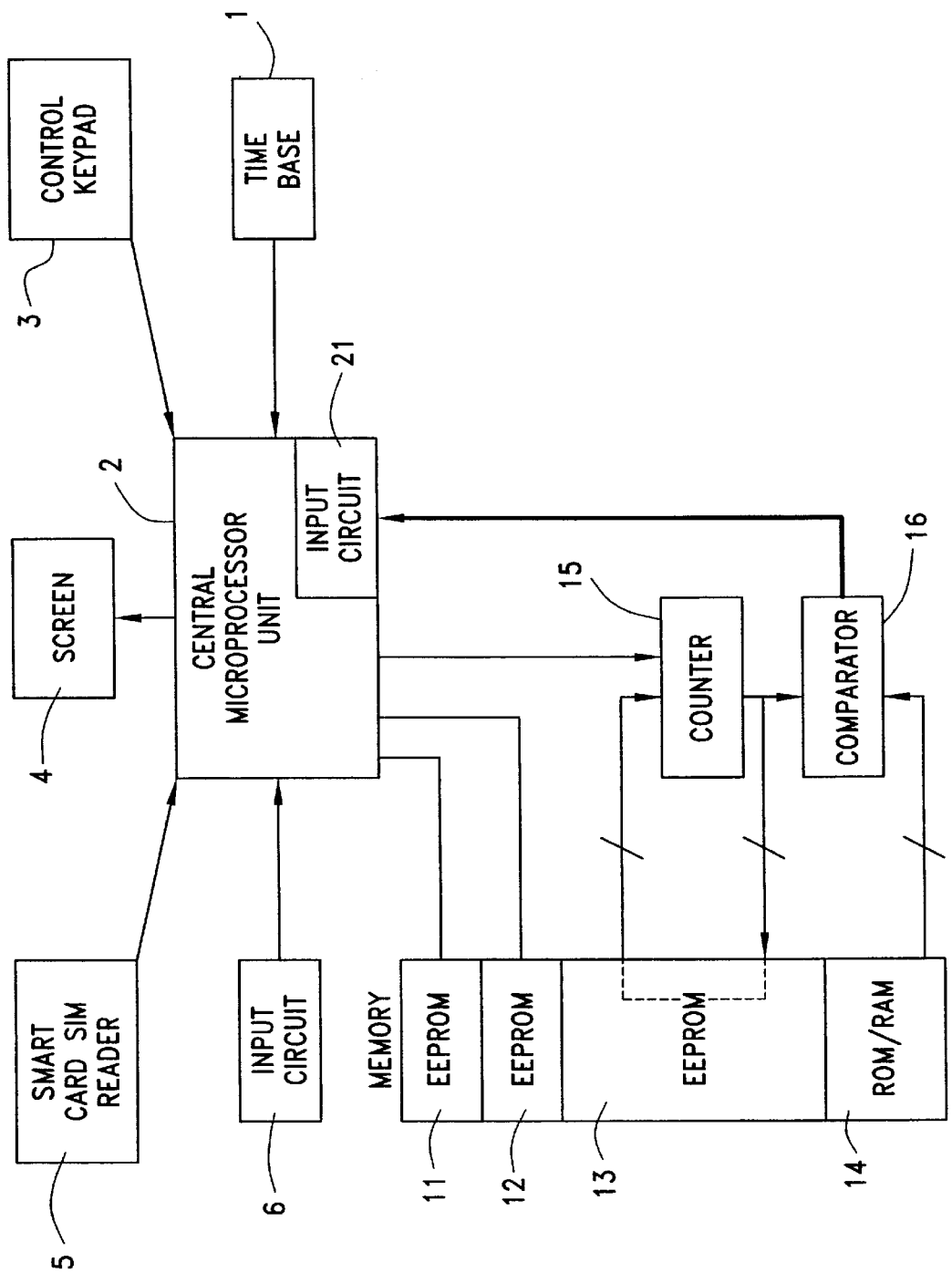

MOBILE TELEPHONE HAVING ANTITHEFT OPERATION AND METHODS THEREOF

This application claims the benefit of French Application No. 98 09856 filed Jul. 31, 1998, which is incorporated herein by reference.

BACKGROUND OF THE INVENTION

A mobile telephone, for a cellular network of GSM type, has the special feature of allowing its holder, if he also possesses an identification module (SIM card), to access the network through the operator which has furnished the SIM card. Thus, any holder of a SIM card can insert it into a mobile telephone and access the network. This can be done even with the mobile telephone of another person, whether borrowed, found, or stolen.

Thus, everyone knows that they must be careful with their telephone, which can be used by others.

The applicant had the idea of preventing theft of these telephone terminals at the production line, or even beyond, in the distribution channels, or back at the factory for after-sale servicing.

First of all, it will be noted that telephone terminal shall mean either the finished device, in its box, or merely the operational electronic card of the terminal.

All mobile telephones are provided with an electronic serial number, so-called international mobile equipment identity (IMEI) number, which one acquires at the parametrizing station or directly on the telephone keypad, after connecting a physical programming key for the IMEI number.

SUMMARY OF THE INVENTION

The present invention concerns, first, an antitheft procedure for mobile telephones for a cellular network, in which, before assigning a definitive identity number to the telephone, one assigns a provisional identity number to the telephone one counts the cumulative duration of operation with a subscriber card SIM, as long as the definitive identity number has not been assigned, when the cumulative duration reaches a limit time, the operation of the telephone is disabled.

Thus, the time of operation is limited, if one has not acquired the definitive identity number. And this definitive number can be acquired at the manufacturer's packaging station or even afterwards, at the distributor, for example, at the cash register, at the time of the transaction. If the limit time is reached, it is assumed that the telephone has been stolen. Otherwise, the programming of the definitive identity number deactivates the antitheft protection.

It will be noted that in a preferred embodiment, the antitheft protection is not finally activated until one uses the telephone with a subscriber card SIM, i.e., a priori, for a telephone call on the network. Thus, the stages of mere manufacture, adjustment, testing or debugging, which are done with a test SIM card or without a SIM card, are not affected by the protection of the invention.

It will be further noted that the procedure of the invention does not in any tangible way disturb the tools, methods, or practices used on the production line.

Advantageously, one will count down, from the limit time, the tests on the actual network with normal SIM card.

Preferably, the operation of the telephone with a test SIM card will be disabled after the time limit of operation without assignment of the definitive identification number.

Preferably, again, each time the device goes idle, the cumulative duration is memorized and saved in EEPROM.

This can be memorized in a region not accessible to the usual maintenance means.

The invention also concerns a mobile telephone for a cellular network, outfitted with antitheft protection means comprising:

means of time counting, which control means of threshold comparison, which command means of disabling the operation of the telephone, which command a keypad (3) of the telephone, means (21) commanded by programming of an identity number IMEI in order to short-circuit the time counting means.

BRIEF DESCRIPTION OF THE DRAWING

The invention will be better understood by means of the following description of a preferred embodiment of the procedure of the invention, referring to the single accompanying FIGURE which shows, by functional blocks, a mobile telephone for implementation of the procedure of the invention.

DESCRIPTION OF THE PREFERRED EMBODIMENTS

Referring to the drawing, a mobile telephone for a cellular network to implement the procedure of the invention comprises a time base 1, controlling the sequencing of a central microprocessor unit 2, which monitors the keys of a control keypad 3 and controls a screen 4. The central unit 2 is also connected to a smart card SIM reader 5 and to an input circuit 6 for receiving a definitive IMEI number programming code.

A subassembly for calculating the cumulative operating time of the telephone in the presence of a SIM card comprises a counter 15, whose advancement is controlled by the central unit 2, which supplies a clock signal to it, and whose outputs are connected to the first inputs of a comparator 16, the second inputs of which receive a fixed value of the operating time limit, here representing ten minutes of operation of the counter 15. This value is saved in a region 14 of memory, such as a ROM or a RAM. In event of cut-out of the power supply to the telephone, the content of the counter 15, representing the cumulative time of usage, is likewise saved in writable memory 13 on the card carrying the components, such as an EEPROM, to be reloaded the next time the power is turned on. The two lines, with a loopback shown in dashes, illustrating these transfers, are shown here only as an illustration, since these are in fact effected through the central unit 2, which detects any loss and any reappearance of the power supply and then furnishes the desired read/write commands and paces the data transfer.

The output of the comparator 16 is connected to an input circuit 21 of the central unit 2. When it switches to the active state, it transmits to the latter an alarm or disable signal, when the total count of the counter 15 reaches the predetermined value in memory 14.

Also, in the same memory subassembly 11–14, there are two zones of EEPROM memory 11 and 12, to save a temporary IMEI number and a definitive IMEI number, respectively.

During fabrication of the card carrying the above components, the procedure of the invention will allow testing during a sufficient time and then prevent any operational use of it with a SIM card. For this, before assigning the definitive IMEI identity number to the telephone, which will be put into memory 12, it is assigned a provisional IMEI identity number, which is put into memory 11, and until such time as the definitive IMEI identity number is assigned, the central unit 2 makes the counter 15 count the cumulative time of operation with a subscriber SIM card, such that when the cumulative time reaches the time limit in memory 14 the operation of the telephone is disabled.

For this, the central unit 2 at first acquires, from the keypad 3 for example, the provisional IMEI number and places it in memory 11. This number here has a format different from a definitive IMEI number, which allows the central unit 2 to distinguish it from the definitive IMEI number. It will be noted, however, that since the only way provided here for writing the definitive IMEI number in memory 12 is an access by the circuit 6, which requires a physical key of restricted access, the mere fact of being able to access the central unit 2 from the circuit 6 indicates that the IMEI number arriving by this protected route is the definitive one. It is then placed in memory 12 and the aforesaid difference in formats is thus not necessary. It would become so again if the provisional IMEI number were also to be acquired through the circuit 6.

The memory 12 being empty, the central unit 2 thus detects that the telephone is supposed to function in protected mode, that is, with the counter 15, which advances when a SIM card is present in the reader 5. In order to allow the final testing, the counter 15 does not advance when no subscriber SIM card is present.

More specifically, in this example, the counter 15 advances in the presence of a normal SIM card, that is, using the time limit of 10 minutes, this entails counting down from it the tests on the actual network. The counter 15 could just as well be a countdown counter, initially loaded with the time limit value. Provision could also be made to disable the operation of the telephone with any SIM test card in the absence of the definitive IMEI number, and when the cumulative operating time with test or normal SIM card has been reached.

The disable is generated by the central unit 2, controlled by the output of the comparator 16, which is itself controlled by the counter 15. This disable has a hysteresis effect to memorize the output state of the comparator 16, for example, by blocking the counter 15, thus preventing the latter from returning to zero, which would change the state of the comparator 16.

The main effect of the disable, with regard to the user, is to make the telephone inoperative, by disabling the keypad 3, that is, by failing to perform the regular scanning of its keys. It will be appreciated that a logical blocking of the radio circuits would have the same end result. The central unit 2 then displays a message indicating that the telephone is locked.

To save the definitive IMEI number in memory, the access key to the central unit 2 is constituted by a device terminal, here, a mobile telephone of controlled access, containing a communication program, that is connected by cable to the central unit 2 by the circuit 6, through a specific and secret protocol, and which transfers to the latter the definitive IMEI number, which will be placed in memory 12.

The detection, by the central unit 2, of the presence of an IMEI number in memory 12, i.e., a definitive number, has the effect of suppressing the disable effect of the active output of the comparator 16, or of preventing this activation in future.

Each time the device goes idle, the central unit 2 tests for the presence of the IMEI number in memory 12 and saves it in the form of a bit in the circuit 21, containing a reading port of the comparator 16, which port can be locked by the output of the one-bit memory mentioned above. The output state of the comparator 16 is also ignored or, in other words, the counter 15 is "short-circuited" and has no effect. As an alternative or supplement, the advancement of the counter 15 can then be blocked by absence of clock signals, or by zero resetting of the latter.

What is claimed is:

1. An antitheft method for a mobile telephone for a cellular network, the mobile telephone including a central unit, a counter, a first memory, a second memory and a third memory, the antitheft method comprising:

assigning a provisional identity number to the mobile telephone in the first memory;

storing a predetermined value in the third memory;

counting with the counter a cumulative duration of operation of the mobile telephone conducted with a SIM card;

testing with the central unit for the presence of a value for a definitive identity number in the second memory;

if the value for a definitive identity number is not present in the second memory, comparing the cumulative duration of operation with the predetermined value, and disabling operation of the mobile telephone if the cumulative duration of operation has reached the predetermined value; and if the value for a definitive identity number is present in the second memory, disabling the counter.

2. An antitheft method as recited in claim 1, wherein the counting includes counting down from the predetermined value duration of testing performed with the mobile telephone on the cellular network using a normal SIM card.

3. An antitheft method as recited in claim 1, wherein the SIM card is a test SIM card.

4. An antitheft method as recited in claim 1, wherein the SIM card is a subscriber SIM card.

5. An antitheft method as recited in claim 1, further comprising saving the cumulative duration of operation in an EEPROM memory.

* * * * *